(12) United States Patent
Joseph et al.

(10) Patent No.: US 6,721,858 B1
(45) Date of Patent: Apr. 13, 2004

(54) PARALLEL IMPLEMENTATION OF PROTOCOL ENGINES BASED ON MEMORY PARTITIONING

(75) Inventors: Douglas J. Joseph, Danbury, CT (US); Maged M. Michael, Danbury, CT (US); Ashwini Nanda, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 736 days.

(21) Appl. No.: 09/644,988

(22) Filed: Aug. 24, 2000

(51) Int. Cl.$^7$ ............................................. G06F 12/00
(52) U.S. Cl. ..................... 711/153; 711/173; 711/157; 712/13
(58) Field of Search ................................. 711/153, 173, 711/157; 712/13

(56) References Cited

PUBLICATIONS

Shen et al.; Cachet. Proceedsings of the 1999 international conference of Supercomputing. May 1999.*

Kaiserswerth. The Parallel Protocol Engine. IEEE/ACM Transactions on Networking (TON). Dec. 1993, vol. 1 Issue 6.*

* cited by examiner

Primary Examiner—Matthew Kim
Assistant Examiner—Matthew D. Anderson
(74) Attorney, Agent, or Firm—Scully, Scott, Murphy & Presser; Derek S. Jennings

(57) ABSTRACT

A method and system for the parallel implementation of protocol engines based on memory partitioning. The method comprises the steps of partitioning a shared memory space into multiple mon-overlapping regions; and for each of the regions, using a respective one protocol engine to handle references to the region, independently of the other protocol engines. Preferably, the memory is partitioned into the non-overlapping regions either by using address interleaving or by using address range registers to identify address ranges for said regions. Also, preferably the protocol engines operate independent of each other and handle accesses to the memory regions in parallel.

18 Claims, 3 Drawing Sheets

PARALLEL IMPLEMENTATION OF PROTOCOL ENGINES BASED ON MEMORY PARTITIONING

BACKGROUND OF THE INVENTION

1. Field of the Invention

The invention relates to efficient protocol handling by employing multiple, parallel protocol engines in shared memory multiprocessor servers using directory based cache coherence.

2. Discussion of the Prior Art

Processors use on chip or off chip cache memories to speed up accesses to system memory. In a shared memory multiprocessor system, more than one processor may store a copy of the same memory locations (or lines) in the respective cache memories. There has to be a cache coherence mechanism to maintain consistency among the multiple cached copies of the same memory line. In small, bus based multiprocessor systems, the coherence mechanism is usually implemented as a part of the cache controllers using a snoopy coherence protocol.

The snoopy protocol can not be used in large systems that are connected through an interconnection network due to the lack of a bus. As a result, these systems use a directory based protocol to maintain cache coherence. The directories are associated with the main memory and they keep the state information on the memory lines, such as which cache has a copy of the line or whether the line has been modified in a cache, and so on. These directories are used by the coherence controllers to implement the coherence protocol in the system.

The current trend in building large shared memory multiprocessors is to use two 8 way SMPs as nodes, or building blocks. Each node connects to an interconnection network through a coherence controller. The coherence controller includes one or more protocol engines to handle the cache coherence traffic among the nodes. When the number of processors per node increases, and/or the processors become faster, the amount of traffic handled by the protocol engines increases and the protocol engine(s) becomes a performance bottleneck.

Prior art implementations for addressing this problem include the use of two protocol engines: one for local memory requests and one for remote memory requests. However, the local and remote protocol engines may also become system bottlenecks.

It would thus be highly desirable to provide a system that further partitions the memory into finer regions to obtain more parallelism in protocol processing.

SUMMARY OF THE INVENTION

An object of the present invention is to provide a system and method for achieving more efficient processing throughput and parallelism in shared multiprocessor memory systems by implementing efficient protocol handling by employing multiple, parallel protocol engines in shared memory multiprocessor servers using directory based cache coherence.

According to the preferred embodiment of the invention, there is provided a system for partitioning the shared memory space into several non-overlapping regions by using address interleaving or using address range registers. Then, one protocol engine may be used to handle references to these memory partitions independently. The multiple protocol engines operate independent of each other and handle the accesses to the corresponding memory regions in parallel. The traffic handled by individual protocol engines is reduced, which results in lower queuing delay and improvement in overall memory access time.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
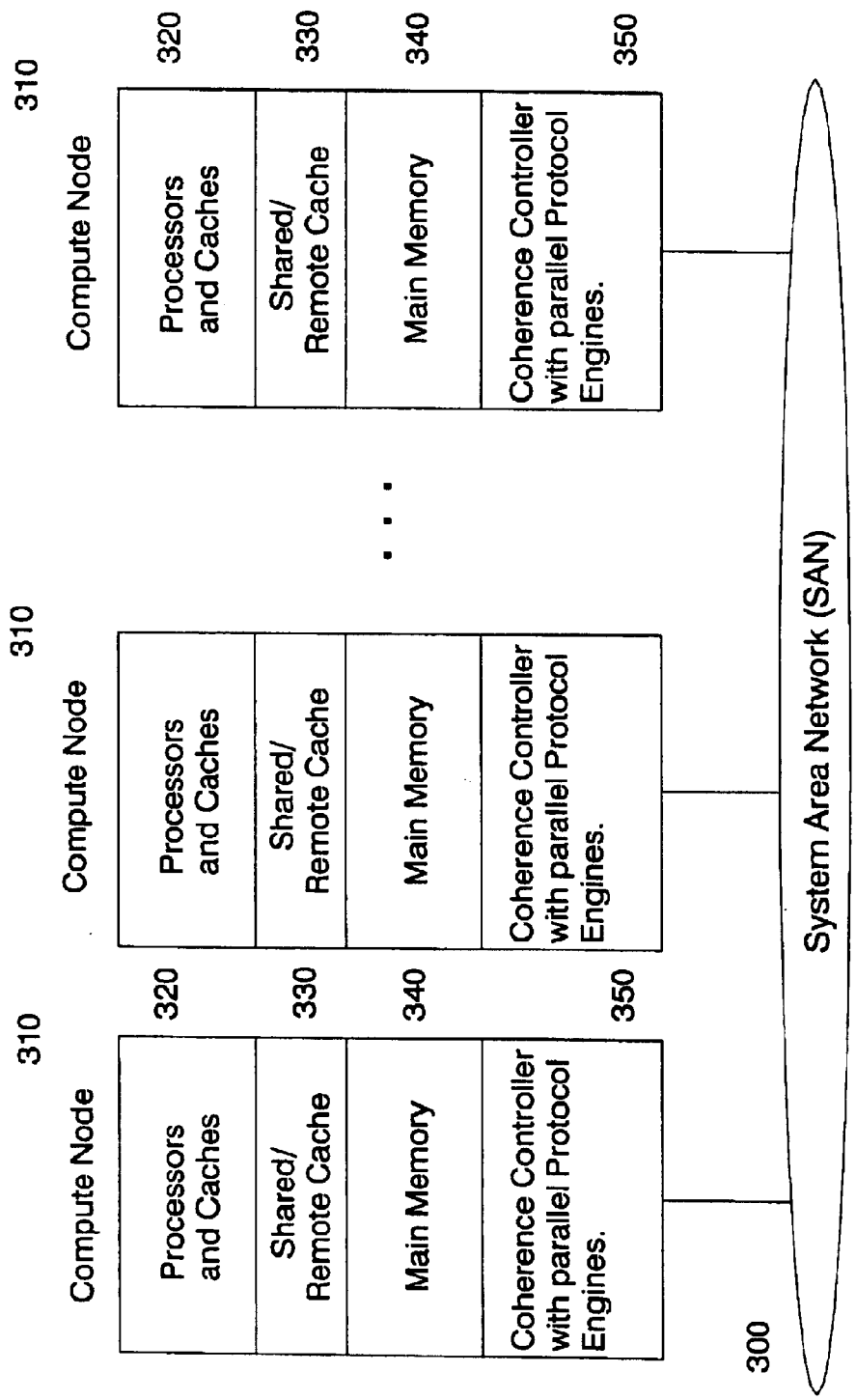
FIG. 1 illustrates a preferred embodiment of the present invention.

The preferred embodiment of the invention, coherence controller with parallel protocol engines is shown in FIG. 1. The compute nodes 310 comprise one or more processors 320, one or more caches 330, one or more main memory modules 340 and several I/O devices (not shown). In each compute node, the coherence controller chip 350 is responsible for maintaining coherence among the caches in the compute node. In the example shown in FIG. 1, the compute nodes may be connected together via a system area network 300.

A protocol engine, or PE, in a coherence controller using multiple protocol engines based on memory partitioning, is a self contained protocol processing unit which handles protocol activities independent of other PEs and shares as few resources as possible with any other PE. Each PE has its own exclusive pending buffer(PB) which is used as a scratch pad for protocol operations in progress. Each PE accesses only the portion of directory dealing with memory locations for which that PE is responsible.

Figure 2:
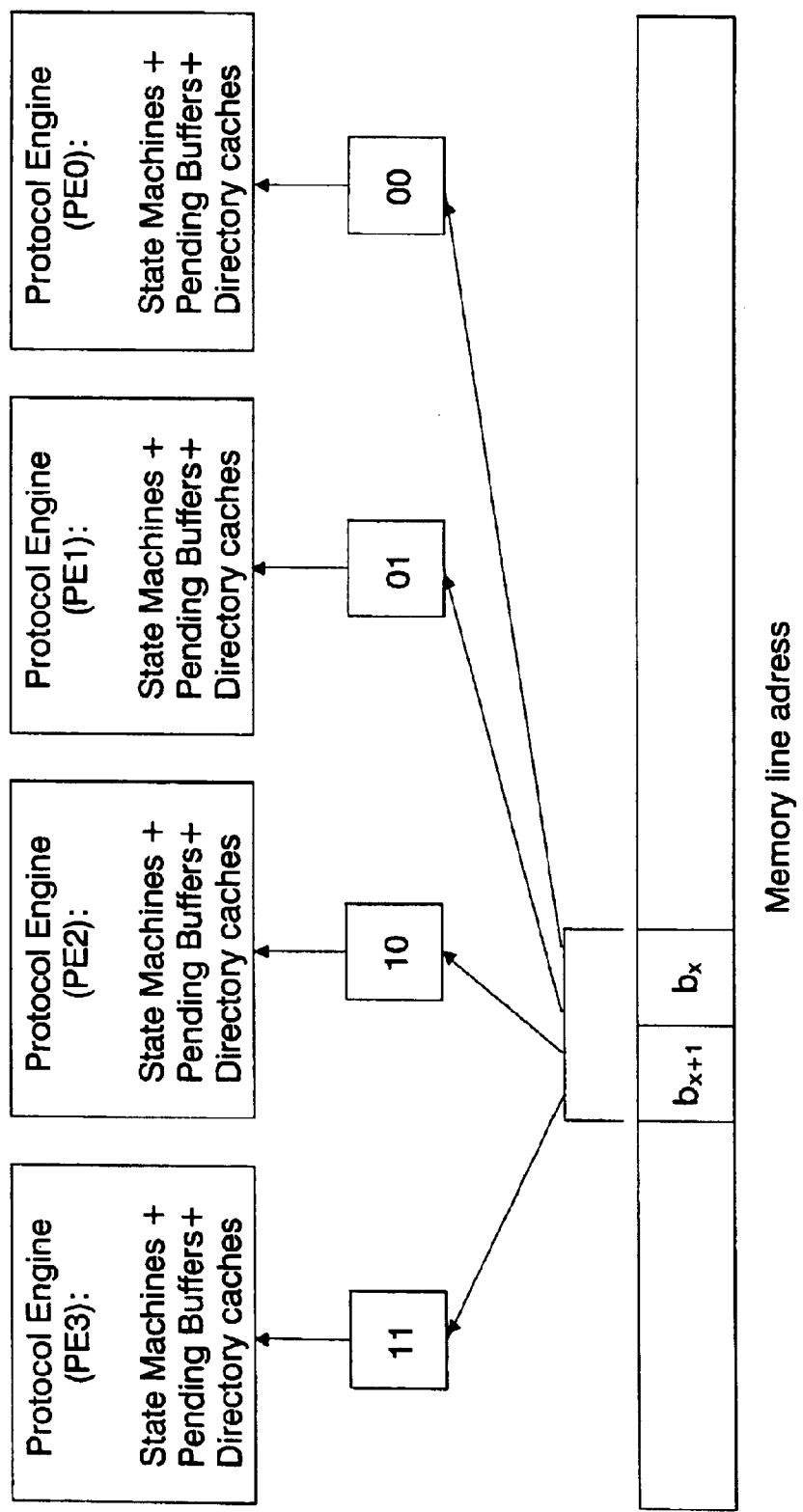
FIG. 2 shows one way to partition the memories of FIG. 1.

Each of the multiple PEs handles a nonoverlapping region of physical memory. One could assign the multiple PEs to interleaved memory regions by using address bits at virtually any position in the physical address field. An example of memory partitioning for four PEs is shown in FIG. 2. Cache line addresses for which the bits $b_{x+1}b_x$ have value '00' are handled by PE0, and the cache line addresses for which the bits have value '01' are handled by PE1, and so forth. For eight PEs, one would need three bits from the cache line address and so on.

A particularly interesting choice of bits to partition memory for this purpose is the low order bits in a cache line address. For example, using only one bit, $b_0$, one can assign the odd cache lines to one PE and the even cache lines to another PE. This kind of memory partitioning to assign multiple PEs intuitively results in less contention, as consecutive memory accesses would go to different PEs.

Figure 3:
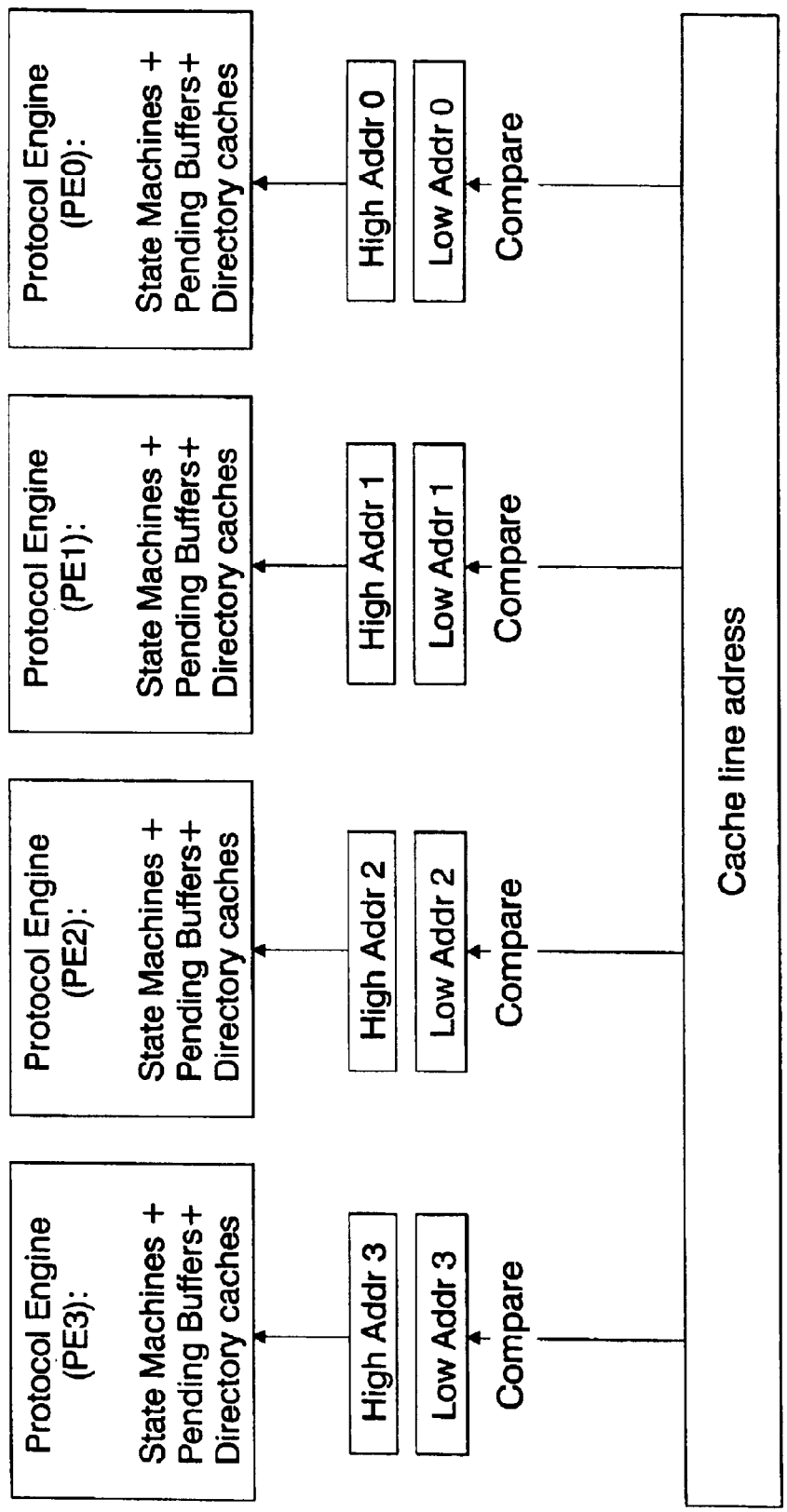
FIG. 3 shows a system in which the memories are partitioned into regions by using range registers.

In the example of FIG. 2, each PE handles an equal number of memory lines. The PEs can also be assigned to unequal regions of memory by using range registers, as shown in FIG. 3. With this embodiment, the access to a memory line is handled by a PE only when the line falls within the range of memory line addresses programmed into the corresponding 'high addr' and 'low addr' range registers.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for the parallel implementation of protocol engines based on memory partitioning, comprising the steps of:

partitioning a shared memory space into multiple non-overlapping regions; and for each of the regions, using a respective one protocol engine to handle references to the region, independently of the other protocol engines.

2. A method according to claim 1, wherein the partitioning step includes the step of partitioning the memory space into interleaved regions.

3. A method according to claim 2, wherein the step of partitioning the memory space into interleaved regions includes the step using addresses of memory locations in the memory space to partition the memory space into the interleaved regions.

4. A method according to claim 3, wherein the step of using addresses to partition the memory space includes the step of using bit values at predetermined bit locations in the address of each memory location to partition the memory space into the interleaved regions.

5. A method according to claim 1, wherein the partitioning step includes the step of partitioning the memory space into non-overlapping regions by using address range registers to identify address ranges for said regions.

6. A method according to claim 1, wherein the protocol engines operate independent of each other and handle accesses to the memory regions in parallel.

7. A shared memory system, comprising:

a shared memory space partitioned into multiple non-overlapping regions;

multiple protocol engines for handling references to the memory regions, wherein for each of the regions, a respective one of the protocol engines handles references to the region, independent of the other protocol engines.

8. A shared memory system according to claim 7, wherein the memory space is partitioned into multiple interleaved regions.

9. A shared memory system according to claim 8, wherein the memory space is partitioned into the interleaved regions on the basis of addresses of memory locations in the memory space.

10. A shared memory system according to claim 8, wherein the memory space is partitioned into the interleaved regions of the basis of bit values at predetermined bit locations in the address of each memory location.

11. A shared memory system according to claim 7, further comprising multiple range registers, each of the range registers identifying a respective address range for one of the memory regions.

12. A shared memory system according to claim 7, wherein the protocol engines operate independent of each other and handle accesses to the memory regions in parallel.

13. A program storage device readable by machine, tangibly embodying a program of instructions executable by the machine to perform method steps for the parallel implementation of protocol engines based on memory partitioning, said method steps comprising:

partitioning a shared memory space into multiple non-overlapping regions; and for each of the regions, using a respective one protocol engine to handle references to the region, independently of the other protocol engines.

14. A program storage device according to claim 13, wherein the partitioning step includes the step of partitioning the memory space into interleaved regions.

15. A program storage device according to claim 14, wherein the step of partitioning the memory space into interleaved regions includes the step using addresses of memory locations in the memory space to partition the memory space into the interleaved regions.

16. A program storage device according to claim 15, wherein the step of using addresses to partition the memory space includes the step of using bit values at predetermined bit locations in the address of each memory location to partition the memory space into the interleaved regions.

17. A program storage device according to claim 13, wherein the partitioning step includes the step of partitioning the memory space into non-overlapping regions by using address range registers to identify address ranges for said regions.

18. A program storage device according to claim 13, wherein the protocol engines operate independent of each other and handle accesses to the memory regions in parallel.

* * * * *